(12) United States Patent
Balest et al.

(10) Patent No.: US 12,520,389 B2
(45) Date of Patent: Jan. 6, 2026

(54) METHOD FOR CONTROLLING TWO COOKING ZONES OF AN INDUCTION COOKING HOB

(71) Applicant: ELECTROLUX APPLIANCES AKTIEBOLAG, Stockholm (SE)

(72) Inventors: Frederico Balest, Forlì (IT); Alex Viroli, Forlì (IT); Laurent Jeanneteau, Compegne (FR); Massimo Nostro, Forlì (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 1084 days.

(21) Appl. No.: 17/059,964

(22) PCT Filed: Jun. 3, 2019

(86) PCT No.: PCT/EP2019/064308
§ 371 (c)(1),
(2) Date: Nov. 30, 2020

(87) PCT Pub. No.: WO2019/238448
PCT Pub. Date: Dec. 19, 2019

(65) Prior Publication Data
US 2021/0212174 A1    Jul. 8, 2021

(30) Foreign Application Priority Data
Jun. 16, 2018    (EP) ..................................... 18178151

(51) Int. Cl.
*H05B 6/06* (2006.01)
*F24C 7/08* (2006.01)
*G05B 19/042* (2006.01)

(52) U.S. Cl.
CPC ........... *H05B 6/065* (2013.01); *G05B 19/042* (2013.01); *F24C 7/083* (2013.01); *G05B 2219/2643* (2013.01)

(58) Field of Classification Search
CPC .................. H05B 6/065; G05B 19/042; G05B 2219/2643; F24C 7/083
See application file for complete search history.

(56) References Cited

U.S. PATENT DOCUMENTS

| 2008/0087661 A1* | 4/2008 | Haag ....................... H05B 6/065 219/620 |
| 2011/0163086 A1* | 7/2011 | Aldana Arjol ....... H05B 6/1272 219/622 |
| 2014/0151365 A1* | 6/2014 | Oh ......................... H05B 6/065 219/662 |

FOREIGN PATENT DOCUMENTS

| EP | 0844807 | 5/1998 |
| EP | 0844807 A1 * | 5/1998 |
| WO | 2016010492 | 1/2016 |

OTHER PUBLICATIONS

Translation of EP-0844807-A1 (Year: 1998).*
(Continued)

*Primary Examiner* — Elizabeth M Kerr
(74) *Attorney, Agent, or Firm* — Chrisman Gallo Tochtrop LLC (57) ABSTRACT

The present invention relates to a method for controlling a first cooking zone (18) and a second cooking zone (20) of an induction cooking hob, wherein each cooking zone (18, 20) is supplied by a corresponding generator (14, 16), and wherein the method comprises the steps of inputting a requested power (P1, P2) for each cooking zone (18, 20), activating a one-zone mode, if the requested power (P1, P2) for one cooking zone (18, 20) is bigger than zero and the requested power (P1, P2) for the other one cooking zone (18,
(Continued)

20) is zero, and activating a two-zones mode, if the requested powers (P1, P2) for both cooking zones (18, 20) are bigger than zero. If the two-zones mode is activated, then an algorithm (48, 50, 52, 54) is selected from a set of algorithms (48, 50, 52, 54) in dependence of the requested powers (P1, P2) for the cooking zones (18, 20).

18 Claims, 7 Drawing Sheets

(56) References Cited

OTHER PUBLICATIONS

International Search Report and Written Opinion for PCT/EP2019/064308 dated Sep. 4, 2019, 12 pages.
Chinese Office action for application No. 201980037090.2 dated Dec. 1, 2022, 8 pages.

* cited by examiner

METHOD FOR CONTROLLING TWO COOKING ZONES OF AN INDUCTION COOKING HOB

The present invention relates to a method for controlling a first cooking zone and a second cooking zone of an induction cooking hob.

In an induction cooking hob acoustic noise may occur, if two or more cooking zones are working with slightly different frequencies at the same time. The acoustic noise is generated by interference between the slightly different frequencies.

WO 2016/010492 A1 discloses a method for reducing the audible noise in an induction cooking hob with a plurality of resonant inductors. The presence of cooking vessels is detected. A master resonant inductor is defined. A common switching frequency is determined for all resonant inductors.

It is an object of the present invention to provide a method for controlling two cooking zones of an induction cooking hob, which allows a reduced acoustic noise.

According to the present invention a method for controlling a first cooking zone and a second cooking zone of an induction cooking hob is provided, wherein each cooking zone is supplied by a corresponding generator, and wherein the method comprises the steps of:
  inputting a requested power for each cooking zone,
  activating a one-zone mode, if the requested power for one cooking zone is bigger than zero and the requested power for the other one cooking zone is zero,
  activating a two-zones mode, if the requested powers for both cooking zones are bigger than zero, and
  if the two-zones mode is activated, then selecting an algorithm from a set of algorithms in dependence of the requested powers for the cooking zones.

The core of the present invention is the selection of a suitable algorithm from the set of algorithms, if both cooking zones have to be activated. Said selection depends on the requested powers for the cooking zones. However, if only one cooking zone has to be activated, then a conventional method would be sufficient.

Preferably, the selection of the algorithm depends on the values of the requested powers for the cooking zones.

Further, the selection of the algorithm depends on the relationship of the requested powers for the cooking zones to each other.

Moreover, the selection of the algorithm depends on the relationship between the requested powers for the cooking zones and the maximum deliverable powers and/or the minimum deliverable powers of said cooking zones.

For example, in the one-zone mode a continuous mode is activated, wherein the frequency of the generator is regulated to meet the requested power without any interruptions during the duty-cycle.

Alternatively, in the one-zone mode a pulsed mode is activated, wherein interruptions of said pulsed mode depend on the requested power for the cooking zone, and wherein preferably the frequency of the generator is regulated to meet a minimum deliverable power of said cooking zone.

In the continuous mode the minimum and maximum deliverable powers are limited. For example, the minimum deliverable power may be several hundred watts. If the requested powers is lower than said minimum deliverable power, then the pulsed mode should be activated.

According to one example, in the two-zones mode a coupled alternate patterns algorithm is activated, if the sum of the requested powers in relation to the respective maximum deliverable power of said cooking zones is between 50% and 100%, but the requested power of one of the cooking zones is below 25% of the of the related maximum deliverable power of said cooking zone.

Preferably, the cooking zone with the lower requested power is defined as a primary zone, while the other one cooking zone is defined as a secondary zone, wherein a pattern duty-cycle activation time for the primary zone is defined as:

$$Tpdc=(P1/minDP1)*Tadcp, or$$

$$Tpdc=(P2/minDP2)*Tadcp, respectively,$$

while the remaining time is provided for the pattern duty-cycle activation time for the secondary zone, wherein Tadcp is an adaptable cycle period and minDP1 and minDP2 are the maximum deliverable powers of the first and second cooking zone, respectively.

According to another example, in the two-zones mode a coupled half-time patterns algorithm is activated, if the sum of the requested powers for the cooking zones in relation to the respective maximum deliverable powers of said cooking zones is between 50% and 100%, but the requested power of any cooking zone is not below 25% of the respective maximum deliverable power.

In particular, the cooking zones are alternatingly activated for the same time period, so that one of the cooking zones is always activated.

Preferably, during a power-on phase the emitted power of each cooking zone doubles the minimum deliverable power of said cooking zones, while the average power of each cooking zone corresponds with the request power for said of said cooking zones.

According to a further example, in the two-zones mode a coupled pulsed strings algorithm is activated, if sum of the requested powers for the cooking zones in relation to the respective maximum deliverable powers of said cooking zones is below 50%.

In particular, for each cooking zone a dedicated duty-cycle activation time related to a pulsed cycle period is calculated by $$Tdc1=(P1/minDP1)*Tcp, and$$

$$Tdc2=(P2/minDP2)*Tcp,$$

wherein minDP1 and minDP2 are the minimum deliverable powers of the cooking zones, and wherein the pulsed cycle period is between two and twelve second, preferably between four and ten seconds, in particular six seconds.

According to an additional example, in the two-zones mode a coupled continuous patterns algorithm is activated, if at least one of the requested powers for the cooking zones is bigger than 50% of the maximum deliverable power of said cooking zone.

Preferably, the cooking zone with the higher requested power is defined as a primary zone, while the other one cooking zone is defined as a secondary zone, wherein the primary zone runs in a continuous mode in order to meet the requested power, while the secondary zone uses the pattern duty-cycle activation time Tpdc related to an adaptable cycle period Tadcp:

$$Tpdc[secondary]=(PR[primary]/PR[secondary])*Tadcp,$$

wherein PR is the requested power of the respective cooking zone.

Novel and inventive features of the present invention are set forth in the appended claims.

The present invention will be described in further detail with reference to the drawing, in which

Figure 1:
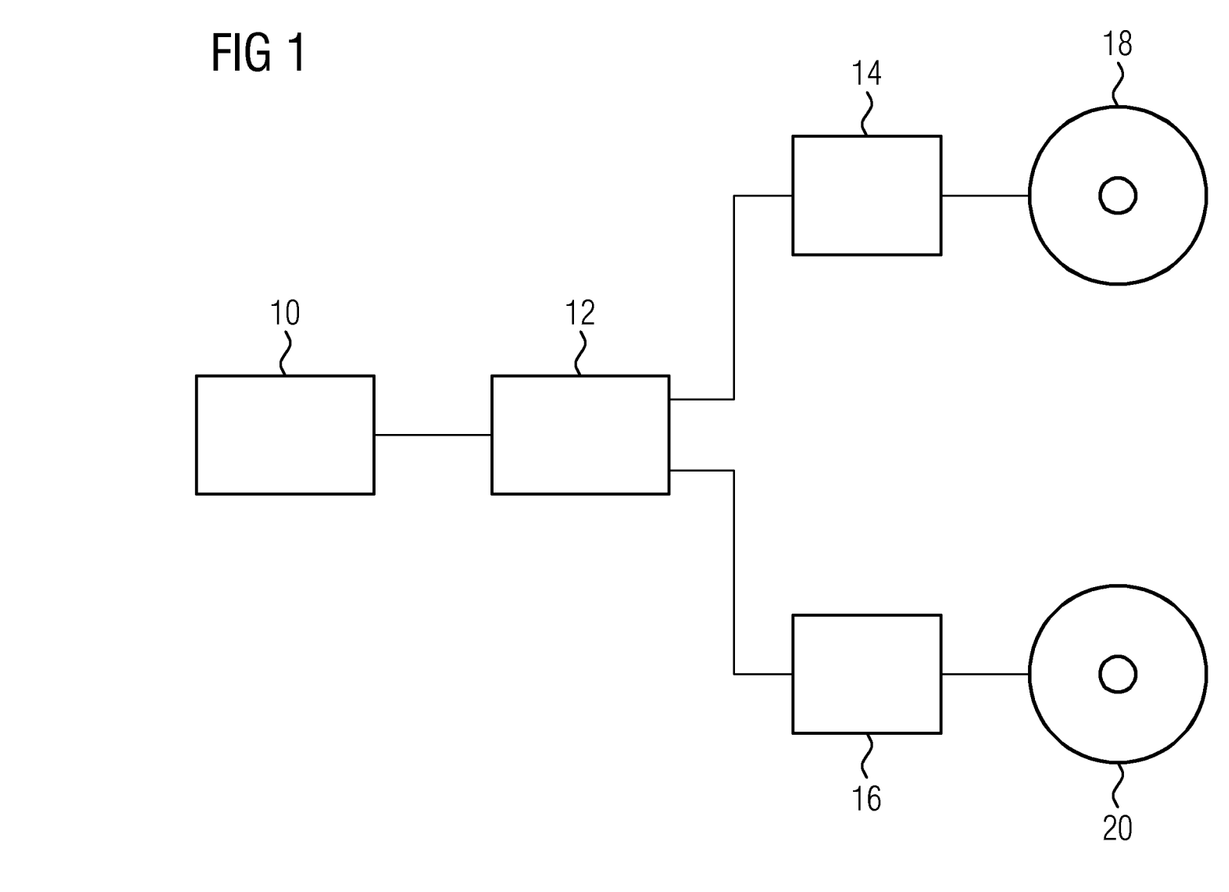
FIG. 1 illustrates a schematic diagram of a circuit for two cooking zones of an induction cooking hob according to a preferred embodiment of the present invention.

FIG. 1 illustrates a schematic diagram of a circuit for two cooking zones 18 and 20 of an induction cooking hob according to a preferred embodiment of the present invention.

The circuit comprises a user interface 10, a micro controller 12, a first generator 14, a second generator 16, a first cooking zone 18 and a second cooking zone 20. In this example, the first cooking zone 18 corresponds with a first induction coil, while the second cooking zone 20 corresponds with a second induction coil. In general, each cooking zone 18 and 20 may comprise one or more induction coils, wherein the induction coils of the same cooking zone 18 or 20 are supplied with the same frequency by a common generator 14 or 16, respectively. The induction coils of the first and second cooking zones 18 and 20 in FIG. 1 are supplied with different frequencies by the first and second generators 14 and 16, respectively. However, if the cooking zone 18 and/or 20 would comprise more induction coils, then the induction coils of the same cooking zone 18 or 20 are supplied with the same frequency by the common generator.

The user interface 10 is operated by the user. In particular, the user selects a first requested power P1 for the first cooking zone 18 and/or a second requested power P2 for the second cooking zone 20 of said user interface 10.

The micro controller 12 controls the first generator 14 and the second generator 16. The first generator 14 and the second generator 16 supply the cooking zones 18 and 20, respectively, with frequencies corresponding with the requested powers P1 and P2.

The induction coils of the cooking zones 18 and 20 provide alternating magnetic fields for generating eddy currents in ferromagnetic portions of cooking utensils on the induction cooking hob in order to heat up said cooking utensils.

The first generator 14 and the second generator 16 are never simultaneously activated in order to avoid acoustic noise. Either the first generator 14 or the second generator 16 is separately activated or both generators 14 and 16 are deactivated. The present invention provides four different algorithms for controlling the first generator 14 and the second generator 16, if the first requested power P1 and the second requested power P2 are both bigger than zero. The selection of one of said four algorithms depends on the amount and the relationship of the first requested power P1 for the first cooking zone 18 and the second requested power P2 for the second cooking zone 20. If one of the requested powers P1 and P2 is zero, then one of two conventional algorithms is activated.

Figure 2:
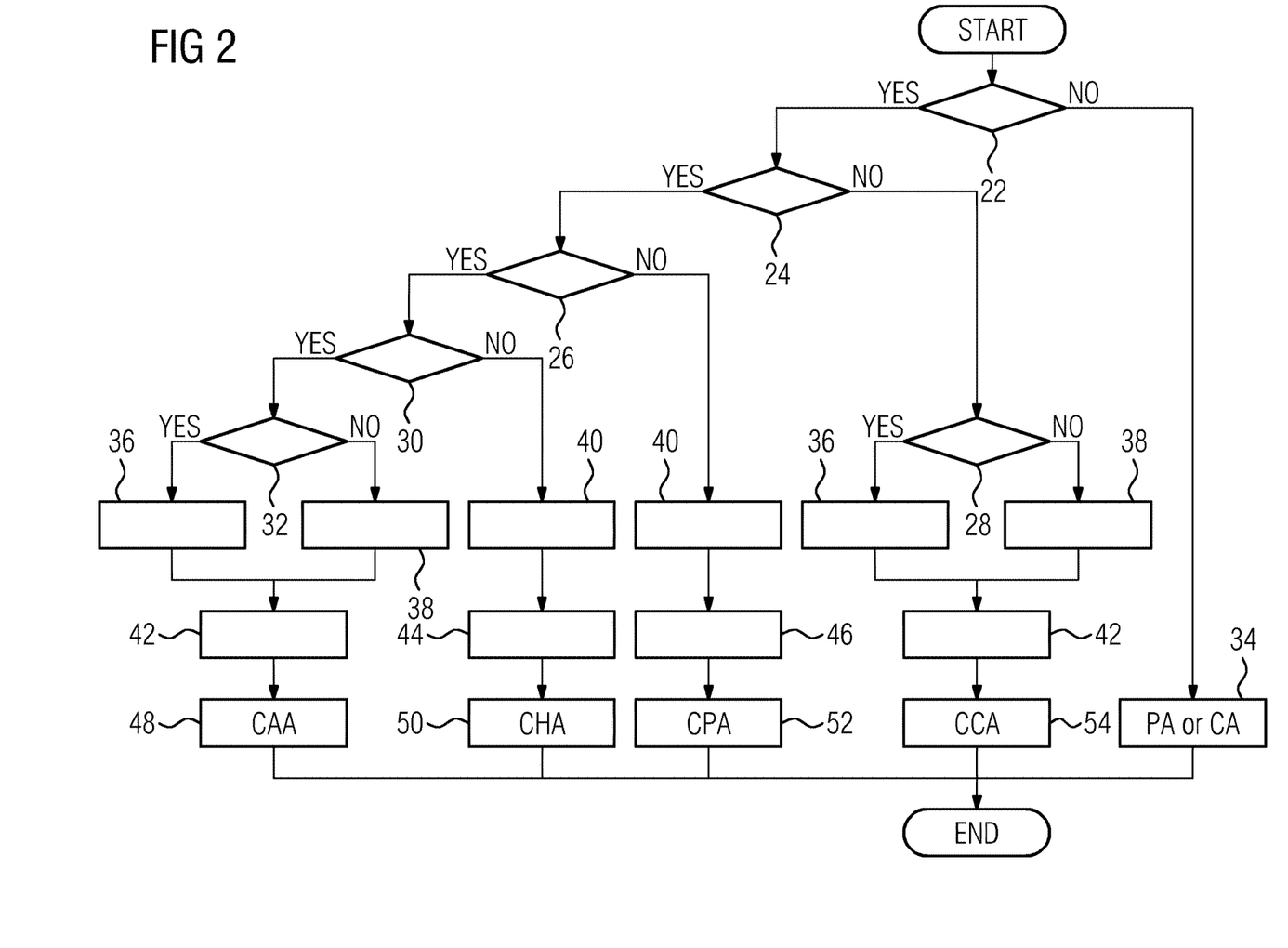
FIG. 2 illustrates a schematic flow chart diagram for selecting an algorithm for controlling the both cooking zones of the induction cooking hob according to the preferred embodiment of the present invention.

FIG. 2 illustrates a schematic flow chart diagram for selecting the algorithm for controlling the both cooking zones 18 and 20 of the induction cooking hob according to the preferred embodiment of the present invention.

In this example, the selection of the algorithm bases on six conditions 22, 24, 26 28, 30 and 32 for the first requested power P1 and the second requested power P2. The selection starts after the user has input the first requested power P1 and the second requested power P2 into the user interface 10. The first condition 22 is defined as

P1>0 AND P2>0.

If the first condition 22 is fulfilled, then both cooking zones 18 and 20 have to be activated. Otherwise, only one of the cooking zones 18 and 20 has to be activated and controlled by the conventional algorithm 34. In the conventional algorithm 34 only one of the generators 14 and 16 is working. The conventional algorithm 34 may be either a continuous mode or a pulsed mode. In the continuous mode the frequency of the generator 14 or 16 is regulated to meet the requested power P1 or P2, respectively, without any interruptions during the duty-cycle. In the pulsed mode the frequency of the generator 14 or 16 is regulated to meet a minimum deliverable power minDP, wherein the interruptions depend on the requested power P1 or P2.

If the first condition 22 is fulfilled, then the second condition 24 has to be checked. The second condition 24 is defined as

P1<50% AND P2<50% in relation to the maximum deliverable power maxDP1 and maxDP2 of the first cooking zone 18 and second cooking zone 20, respectively.

If the second condition 24 is fulfilled, then the third condition 26 has to be checked. Otherwise, the fourth condition 28 has to be checked. The third condition 26 is defined as (P1+P2)>50%, in relation to the respective maximum deliverable power maxDP1 and maxDP2 of the first cooking zone 18 and second cooking zone 20, while the fourth condition 28 is defined as

P1>P2.

If the fourth condition 28 is fulfilled, then in a step 36 the first cooking zone 18 is defined as a primary zone, while the second cooking zone 20 is defined a secondary zone. Otherwise, in a step 38 the second cooking zone 20 is defined as the primary zone, while the first cooking zone 18 is defined the secondary zone. Then, after the step 36 or 38, respectively, a patterns adaptable period duty-cycle is evaluated in a step 42. Then, in a step 54 a coupled continuous patterns algorithm (CCA) is performed.

If the third condition 26 is not fulfilled, then the first cooking zone 18 and the second cooking zone 20 are defined as independent zones in a step 40. In the step 40, no primary or secondary zones are defined. Then, a six-seconds-period duty-cycle is evaluated in a step 46. Then, in a step 52 a coupled pulsed string algorithm (CPA) is performed.

If the third condition 26 is fulfilled, then the fifth condition 30 has to be checked. The fifth condition 30 is defined as

P1<25% OR P2<25% in relation to the maximum deliverable power maxDP1 and maxDP2 of the first cooking zone 18 and second cooking zone 20, respectively.

If the fifth condition 30 is not fulfilled, then the first cooking zone 18 and the second cooking zone 20 are defined as independent zones in the step 40. In said step 40, no primary or secondary zones are defined. Then, a patterns fixed period duty-cycle is evaluated in a step 44. Then, in a step 50 a coupled half-time patterns algorithm (CHA) is performed.

If the fifth condition 30 is fulfilled, then a sixth condition 32 has to be checked. The sixth condition 32 is defined as

P1<P2.

If the sixth condition 32 is not fulfilled, then the first cooking zone 18 is defined as the secondary zone, while the second cooking zone 20 is defined as the primary zone, in the step 38. In contrast, if the sixth condition 32 is fulfilled, then the first cooking zone 18 is defined as the primary zone, while the second cooking zone 20 is defined as the secondary zone, in the step 36.

Then, after the step 36 or 38, respectively, a patterns adaptable period duty-cycle is evaluated in the step 42. Then, in a step 48 a coupled alternate patterns algorithm (CAA) is performed.

Figure 3:
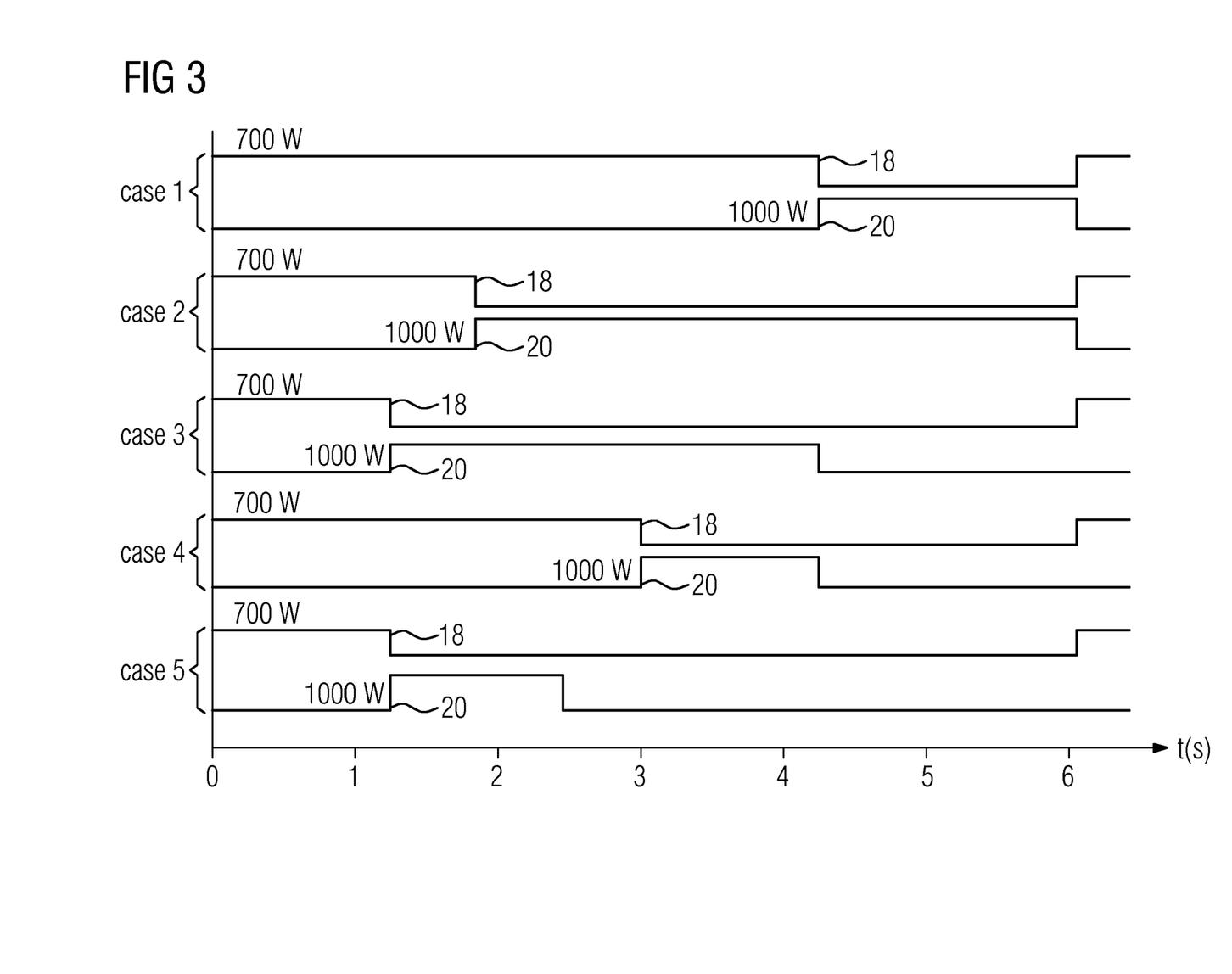
FIG. 3 illustrates a schematic time diagram of a coupled pulsed strings algorithm (CPA) for controlling the both cooking zones of the induction cooking hob according to the preferred embodiment of the present invention.

FIG. 3 illustrates a schematic time diagram of the coupled pulsed strings algorithm (CPA) for controlling the both cooking zones 18 and 20 of the induction cooking hob according to the preferred embodiment of the present invention.

The coupled pulsed strings algorithm (CPA) is activated, if the requested powers P1 and P2 for the cooking zones 18 and 20, respectively, are bigger than zero and the sum of said requested powers P1 and P2 in relation to the respective maximum deliverable powers maxDP1 and maxDP2 of said cooking zones 18 and 20 are below 50%. For each cooking zone 18 and 20 a dedicated duty-cycle activation time Tdc related to a pulsed cycle period Tcp is calculated by $Tdc1 = (P1/minDP1)*Tcp$, and $Tdc2 = (P2/minDP2)*Tcp$, wherein minDP1 and minDP2 are the minimum deliverable power of each cooking zone 18 and 20. In this example, the pulsed cycle period Tcp is six seconds. The percentage duty-cycle activation time Tdc % is calculated by $Tdc\% = (Tdc/Tcp)*100$.

Since the sum of the requested powers P1 and P2 is below 50% of the maximum deliverable power maxDP, the total duty-cycle activation time Tdc is always below 100%.

The table below shows the numerical values for the five cases of the coupled pulsed strings algorithm (CPA) shown in FIG. 3.

| Case | first cooking zone maxDP1 = 1400 W minDP1 = 700 W P1: | Tdc %: | second cooking zone maxDP2 = 2000 W minDP2 = 1000 W P2: | Tdc %: | both cooking zones maxDP = 3400 W minDP = 1700 W P1 + P2: | Tdc %: |
|---|---|---|---|---|---|---|
| 1 | 490 W (35%) | 70% | 300 W (15%) | 30% | 790 W (50%) | 100% |
| 2 | 210 W (15%) | 30% | 700 W (35%) | 70% | 910 W (50%) | 100% |
| 3 | 140 W (10%) | 20% | 500 W (25%) | 50% | 640 W (35%) | 70% |
| 4 | 350 W (25%) | 50% | 200 W (10%) | 20% | 550 W (35%) | 70% |
| 5 | 140 W (10%) | 20% | 200 W (10%) | 20% | 340 W (20%) | 40% |

Always, at the most one of the both cooking zones 18 and 20 is activated at the same time. This guarantees that no acoustic noise occurs.

Figure 4:
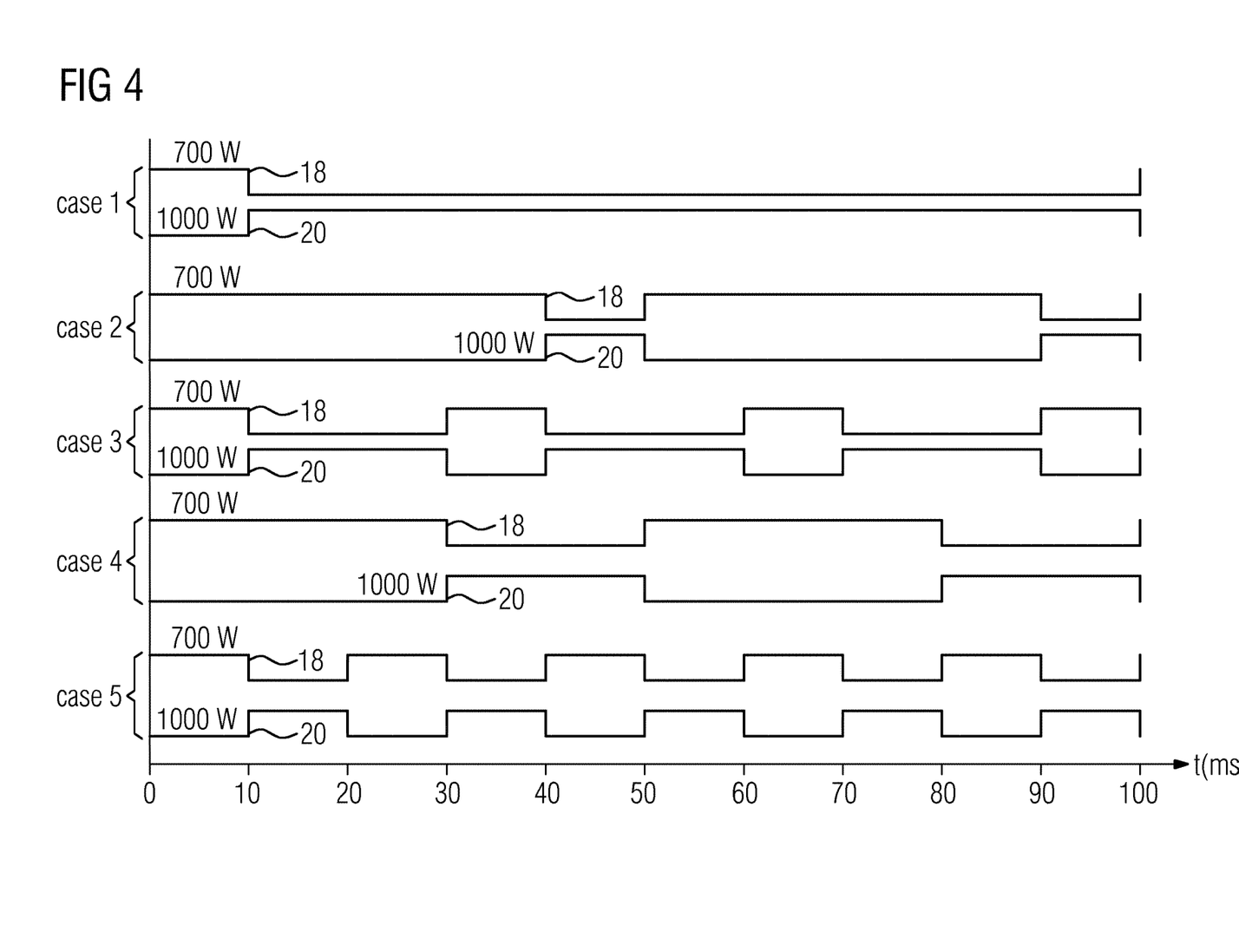
FIG. 4 illustrates a schematic time diagram of a coupled alternate patterns algorithm (CAA) for controlling the both cooking zones of the induction cooking hob according to the preferred embodiment of the present invention.

FIG. 4 illustrates a schematic time diagram of the coupled alternate patterns algorithm (CAA) for controlling the both cooking zones 18 and 20 of the induction cooking hob according to the preferred embodiment of the present invention.

The coupled alternate patterns algorithm (CAA) is activated, if the requested powers P1 and P2 of the cooking zones 18 and 20, respectively, are bigger than zero and the sum of said requested powers P1 and P2 in relation to the respective maximum deliverable powers maxDP1 and maxDP2 of said cooking zones 18 and 20 is between 50% and 100%, but the requested power P1 or P2 of one of the cooking zones 18 and 20 is below 25% of the related maximum deliverable power maxDP1 or maxDP2, respectively.

The cooking zone 18 or 20 with the lower requested power P1 or P2, respectively, is selected as the primary zone, while the other one will be defined as the secondary zone. In this example, the first cooking zone 18 is the primary zone, while the second cooking zone 20 is the secondary zone.

The primary zone imposes a pattern duty-cycle activation time Tpdc related to an adaptable cycle period Tadcp:

$Tpdc[primary] = (P1/minDP)*Tadcp$, and a percentage pattern duty-cycle activation time Tpdc %:

$Tpdc\%[primary] = (Tpdc[primary]/Tadcp)*100$, while the secondary zone will follow taking the remaining portion of the percentage pattern duty-cycle activation time:

$Tpdc\%[secondary] = (1 - Tpdc\%[primary])$.

The sum of the duty-cycles must be always 100% of the selected cycle period in order to meet that the primary zone generates a power equal to the minimum deliverable power minDP during the active phase:

$target\ power[primary] = minDP1$, and the secondary zone will generate during the active phase a power bigger or equal than the minimum deliverable power minDP:

$target\ power[secondary] = 100*minDP2/Tpdc\%[secondary]$

The patterns are followed by time spread configurations, wherein the adaptable cycle period Tadcp of each cooking zone 18 and 20 changes according to the requested power P1 and P2 and the pattern duty-cycle activation time Tpdc. For example, a granularity of about 10% minimizes the power-off phase and preserves system from flickering noise.

The table below shows the numerical values for the five cases of the coupled alternate patterns algorithm (CAA) shown in FIG. 4.

| | first cooking zone maxDP1 = 1400 W minDP1 = 700 W | | second cooking zone maxDP2 = 2000 W minDP2 = 1000 W | | both cooking zones maxDP = 3400 W minDP = 1700 W | |
|---|---|---|---|---|---|---|
| Case | P1: | Tpdc %: | P2: | Tpdc %: | P1 + P2: | Tpdc %: |
| 1 | 70 W (5%) | 10% | 1000 W (50%) | 90% | 1070 W (55%) | 100% |
| 2 | 560 W (40%) | 80% | 200 W (10%) | 20% | 960 W (60%) | 100% |
| 3 | 350 W (15%) | 30% | 800 W (40%) | 70% | 1150 W (65%) | 100% |
| 4 | 630 W (45%) | 60% | 400 W (20%) | 40% | 1130 W (70%) | 100% |
| 5 | 700 W (50%) | 50% | 500 W (25%) | 50% | 1130 W (75%) | 100% |

FIG. 4 clarifies that never both cooking zones 18 and 20 area activated at the same time. Thus, no acoustic noise may occur.

Figure 5:
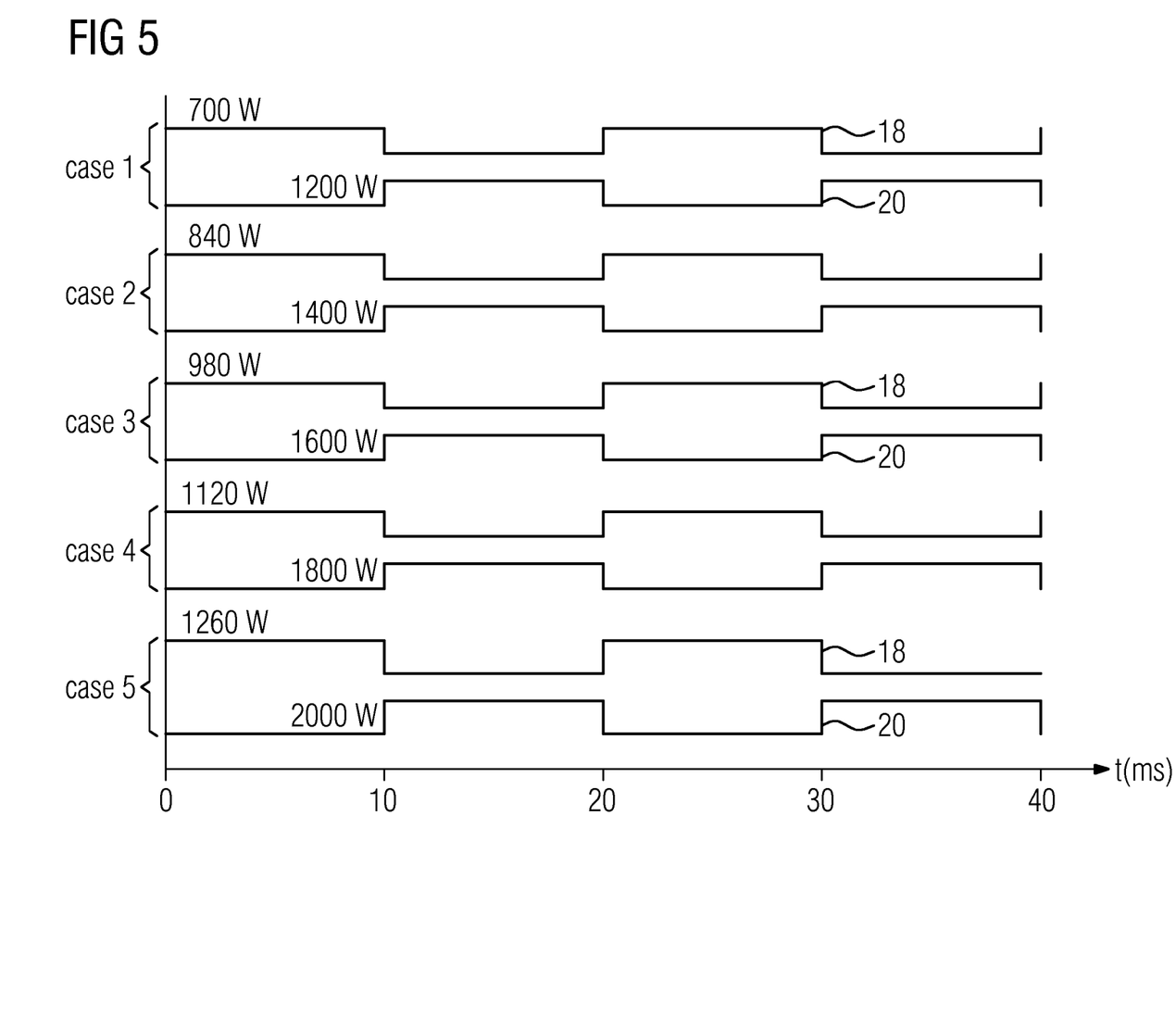
FIG. 5 illustrates a schematic time diagram of a coupled half-time patterns algorithm (CHA) for controlling the both cooking zones of the induction cooking hob according to the preferred embodiment of the present invention.

FIG. 5 illustrates a schematic time diagram of the coupled half-time patterns algorithm (CHA) for controlling the both cooking zones 18 and 20 of the induction cooking hob according to the preferred embodiment of the present invention.

The coupled half-time patterns algorithm (CHA) is activated, if the requested powers P1 and P2 of the cooking zones 18 and 20, respectively, are bigger than zero, the sum of said requested powers P1 and P2 in relation to the respective maximum deliverable power maxDP1 and maxDP2 is between 50% and 100%, but the requested powers P1 and P2 of any cooking zone 18 and 20 are not below 25% of the related maximum deliverable powers maxDP1 and maxDP2.

In the coupled half-time patterns algorithm (CHA) the selection of primary and secondary zone is not required, since both cooking zones 18 and 20 can work with the same timing and a 50% pattern duty-cycle activation time Tpdc related to a fixed cycle period Tfcp will be configured:

Tpdc=Tfcp/2

Tpdc %=50%

The sum of duty-cycles will be always 100%, since both cooking zones 18 and 20 have the same cycle period. The frequency of each generator 14 and 16 is controlled, wherein the emitted power during the active phase doubles the minimum deliverable power minDP and the average level will meet the requested power P1 and P2. The patterns are followed a time spread configuration with a fixed cycle period Tfcp. For example, a granularity of about 10% minimizes the power-off phase and preserves system from flickering noise.

The table below shows the numerical values for the five cases of the coupled half-time patterns algorithm (CHA) shown in FIG. 5.

| | first cooking zone maxDP1 = 1400 W minDP1 = 700 W | | second cooking zone maxDP2 = 2000 W minDP2 = 1000 W | | both cooking zones maxDP = 3400 W minDP = 1700 W | |
|---|---|---|---|---|---|---|
| Case | P1: | Tdc %: | P2: | Tdc %: | P1 + P2: | Tdc %: |
| 1 | 350 W (25%) | 50% | 600 W (30%) | 50% | 1070 W (55%) | 100% |
| 2 | 420 W (30%) | 50% | 700 W (35%) | 50% | 960 W (65%) | 100% |
| 3 | 490 W (35%) | 50% | 800 W (40%) | 50% | 1150 W (75%) | 100% |
| 4 | 560 W (40%) | 50% | 900 W (45%) | 50% | 1130 W (85%) | 100% |
| 5 | 630 W (45%) | 50% | 1000 W (50%) | 50% | 1130 W (95%) | 100% |

FIG. 5 clarifies that never both cooking zones 18 and 20 are activated at the same time, so that no acoustic noise may occur.

Figure 6:
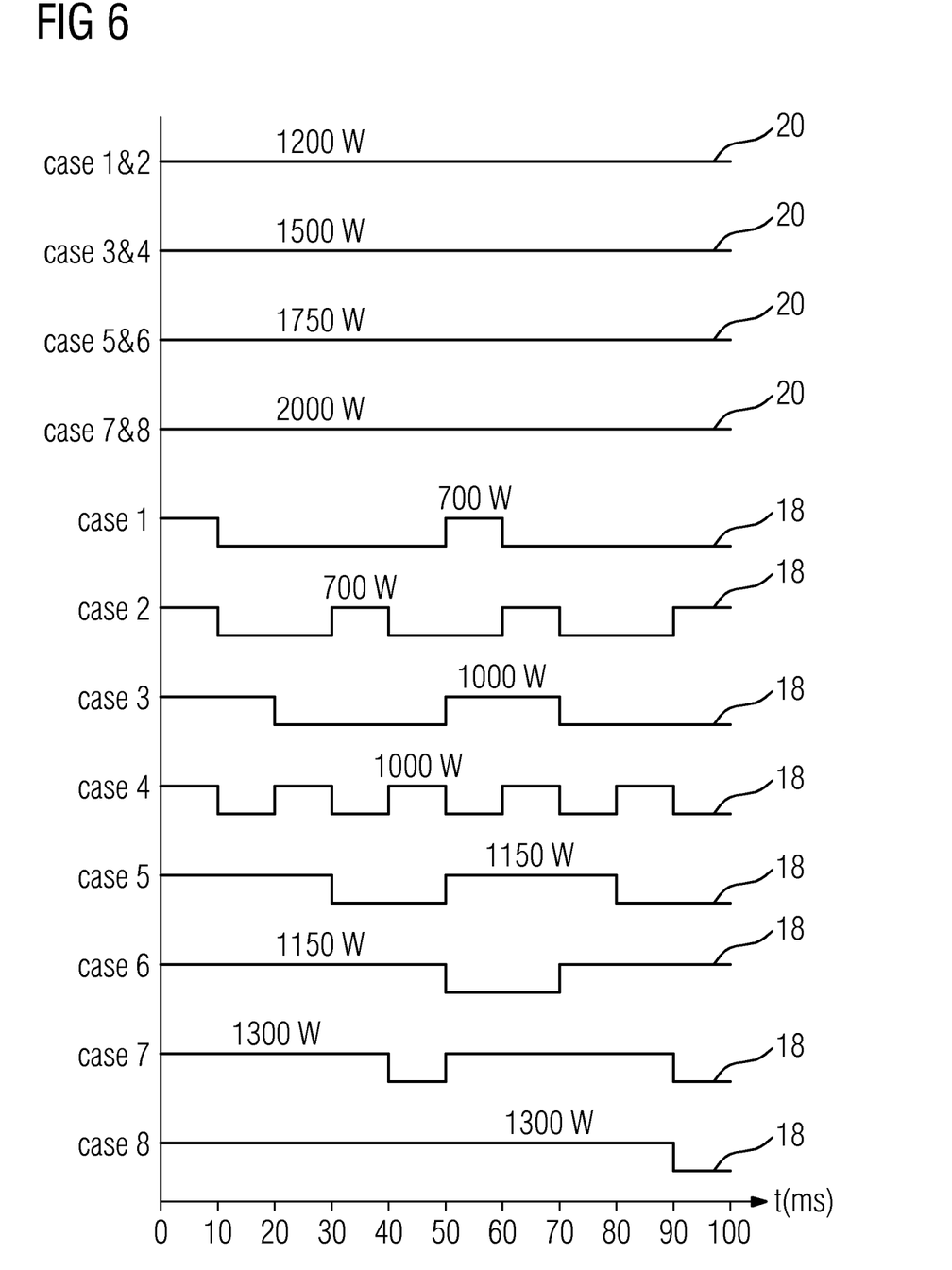
FIG. 6 illustrates a schematic time diagram of a coupled continuous patterns algorithm (CCA) for controlling the both cooking zones of the induction cooking hob according to the preferred embodiment of the present invention.

FIG. 6 illustrates a schematic time diagram of the coupled continuous patterns algorithm (CCA) for controlling the both cooking zones 18 and 20 of the induction cooking hob according to the preferred embodiment of the present invention.

The coupled continuous patterns algorithm (CCA) is activated, if the requested powers P1 and P2 of the cooking zones 18 and 20, respectively, are bigger than zero and at least one of said requested powers P1 and P2 is bigger than 50% of the maximum deliverable power maxDP1 and maxDP2, respectively.

The cooking zone 18 or 20 with the higher requested power P1 or P2, respectively, is defined as the primary zone, while the other one is defined as the secondary zone. In this example, the second cooking zone 20 is defined as the primary zone.

The generators 14 and 16 are controlled to work at similar frequencies defined to have a proper gap between each other. The second generator 16 for the primary zone is kept as reference. The value of the frequency difference is selected according to operative conditions and must be within a proper range in order to meet low acoustic beats interference on the one hand and minimized radiated and conducted emissions on the other hand.

The reference switching frequency is imposed by the primary zone, wherein said primary zone runs in a continuous mode in order to meet the requested power level P2:

target power[primary]=P2.

In standard conditions, the target power corresponds with the requested power level P2.

The first cooking zone 18, i.e. the secondary zone, uses the pattern duty-cycle activation time Tpdc related to an adaptable cycle period Tadcp, which depends on its target power and is imposed by the primary zone:

Tpdc[secondary]=(P1/P2)*Tadcp,

Tpdc %[secondary]=(Tpdc[secondary]/Tadcp)*100.

The table below shows the numerical values for the eight cases of the coupled continuous patterns algorithm (CCA) shown in FIG. 6.

| | first cooking zone<br>maxDP1 = 1400 W<br>minDP1 = 700 W | | | second cooking zones<br>maxDP2 = 3400 W<br>minDP2 = 1700 W | |
|---|---|---|---|---|---|
| Case | target power: | P1: | Tdc %: | P2: | frequency: |
| 1 | 700 W (50%) | 140 W (10%) | 20% | 1200 W (60%) | 28 kHz |
| 2 | 560 W (40%) | 210 W (10%) | 30% | 1200 W (60%) | 28 kHz |
| 3 | 350 W (15%) | 400 W (40%) | 40% | 1500 W (75%) | 26 kHz |
| 4 | 630 W (45%) | 500 W (20%) | 50% | 1500 W (75%) | 26 kHz |
| 5 | 700 W (50%) | 700 W (25%) | 60% | 1750 W (87%) | 24 kHz |
| 6 | 350 W (15%) | 800 W (40%) | 70% | 1750 W (87%) | 24 kHz |
| 7 | 1300 W (45%) | 1050 W (20%) | 80% | 2000 W (100%) | 22 kHz |
| 8 | 1300 W (50%) | 1200 W (25%) | 90% | 2000 W (100%) | 22 kHz |

Each cooking zone 18 and 20 of the induction cooking hob has different characteristics. This results in a big influence on the power switch, i.e. IGBT, driving frequency. Additionally, each cooking vessel introduces a different parameter into the power control loop. At the moment of the frequency definition for the primary zone, the generator 14 for the secondary zone will be forced to operate using a driving period that depends on the primary zone. Constraints of this process are imposed by the system, e.g. the architecture of the generators 14 and 16, the induction coils, the characteristics of the cooking vessel and the driving method itself, in particular the frequency gap for the power distribution.

Figure 7:
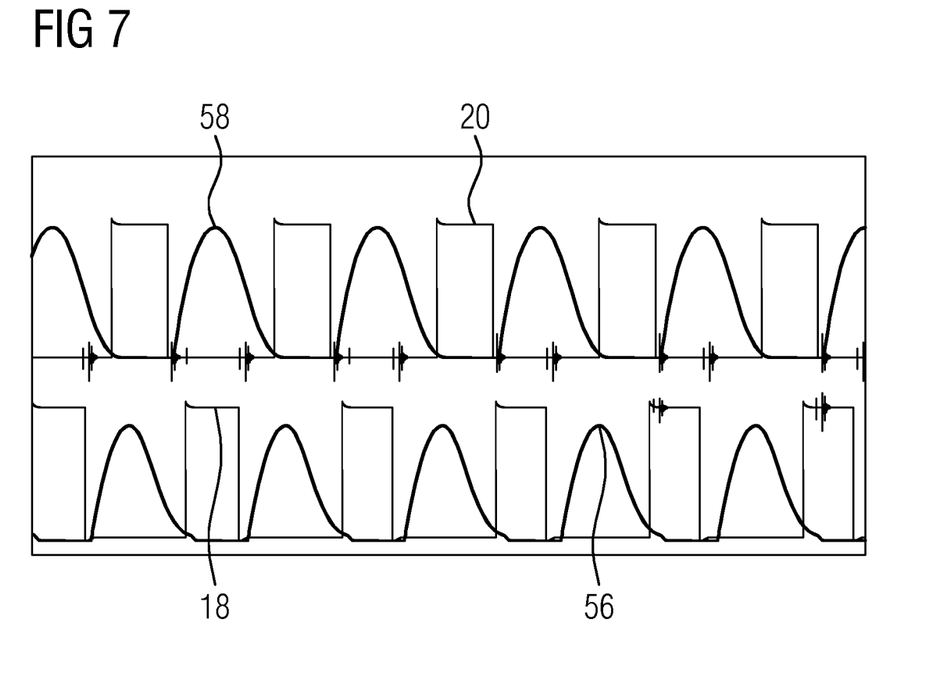
FIG. 7 illustrates a detailed time diagram of the coupled continuous patterns algorithm (CCA) for controlling the both cooking zones of the induction cooking hob according to the preferred embodiment of the present invention.

FIG. 7 illustrates a detailed time diagram of the coupled continuous patterns algorithm (CCA) for controlling the both cooking zones 18 and 20 of the induction cooking hob according to the preferred embodiment of the present invention.

A first gate driving signal 56 and a second gate driving signal 58 for the power switches, i.e. IGBT, of the generators 14 and 16, respectively, are shown.

The period of the primary zone is 40 μs, which corresponds with a driving frequency of 25.5 kHz. The power-om period is 14 μs, while the power-off period is 26 μs. The time gap between the primary and secondary zones is about 2.5 μs. Thus, the period of the secondary zone is 37.5 μs, which corresponds with a driving frequency of 26.7 kHz. The power-om period is 13 μs, while the power-off period is 24.5 μs.

The activation time of the secondary zone depends on the PWM period of the primary zone related to power request P2. Further, the activation time depends on the coupling parameter of the induction coil and the cooking vessel. Moreover, the activation time depends on the frequency gap of the power distribution.

In order to achieve requested power, only the driving frequency of the primary zone will be directly adjusted within a specified range, while the selection of the pattern and the regulation of the time gap act on the power for the secondary zone. The secondary pattern follows a time spread configuration, wherein the adaptable cycle period Tadcp changes according to the requested power and the target power of the secondary zone. For example, a granularity of 10% minimizes the power-off phase and preserves system from flickering noise.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 user interface
12 micro controller
14 first generator
16 second generator
18 first cooking zone
20 second cooking zone
22 first condition
24 second condition
26 third condition
28 fourth condition
30 fifth condition
32 sixth condition
34 step of performing the conventional algorithm
36 step of defining the first cooking zone as primary zone and the second cooking zone as secondary zone
38 step of defining the first cooking zone as secondary zone and the second cooking zone as primary zone
40 step of defining both cooking zones as independent zones
42 step of evaluating patterns adaptable period duty-cycle
44 step of evaluating patterns forced period duty-cycle
46 step of evaluating six-seconds period duty-cycle
48 step of performing the coupled alternate patterns algorithm
50 step of performing the coupled half-time patterns algorithm
52 step of performing the coupled pulsed strings algorithm
54 step of performing the coupled continuous patterns algorithm
56 first gate driving signal
58 second gate driving signal
P1 requested power of the first cooking zone
P2 requested power of the second cooking zone
maxDP1 maximum deliverable power of the first cooking zone
maxDP2 maximum deliverable power of the second cooking zone
maxDP total maximum deliverable power
minDP1 minimum deliverable power of the first cooking zone
minDP2 minimum deliverable power of the second cooking zone
minDP total minimum deliverable power
Tdc duty-cycle activation time
Tdc1 duty-cycle activation time of the first cooking zone Tdc2 duty-cycle activation time of the second cooking zone
Tdc % percentage duty-cycle activation time
Tcp pulsed cycle period
Tpdc pattern duty-cycle activation time
Tadcp adaptable cycle period

The invention claimed is:

1. A method for controlling a first cooking zone and a second cooking zone of an induction cooking hob, comprising selecting a suitable algorithm for operation of one or both of said first and second cooking zones according to the following steps:
   receiving at least one of a first requested power (P1) for the first cooking zone or a second requested power (P2) for the second cooking zone;
   performing an evaluating step that comprises determining whether a first condition is satisfied, the first condition being defined as both P1>0 and P2>0, wherein if the first condition is satisfied the evaluating step further comprises determining at least one of whether:
      a second condition is satisfied, the second condition being defined as both P1<50% of a first maximum deliverable power (maxDP1) for the first cooking zone and P2<50% of a second maximum deliverable power (maxDP2) for the second cooking zone,
      a third condition is satisfied, the third condition being defined as (P1+P2)>50% of both of the respective maxDP1 and maxDP2,
      a fourth condition is satisfied, the fourth condition being defined as P1>P2,
      a fifth condition is satisfied, the fifth condition being defined as P1<25% of maxDP1 or P2<25% of maxDP2, or
      a sixth condition is satisfied, the sixth condition being defined as P1<P2; and
   based on a result of the evaluating step:
      operating only one of the first and second cooking zones according to a first algorithm,
      operating the first and second cooking zones according to a second algorithm,
      operating the first and second cooking zones according to a third algorithm,
      operating the first and second cooking zones according to a fourth algorithm, or
      operating each of the first and second cooking zones together according to a fifth algorithm,
   wherein the evaluating step comprises determining whether the second condition is satisfied.

2. The method according to claim 1, wherein the method comprises:
   determining whether the third condition is satisfied,
   determining whether the fifth condition is satisfied, and
   operating the first and second cooking zones according to the fifth algorithm based on the first, third, and fifth conditions being satisfied,
   wherein a primary cooking zone of the fifth algorithm is the cooking zone having the lower requested power, and a secondary cooking zone of the fifth algorithm is the cooking zone having the higher requested power.

3. The method according to claim 1, wherein the method comprises:
   determining whether the third condition is satisfied,
   determining whether the fifth condition is satisfied, and
   operating the first and second cooking zones according to the fourth algorithm based on the second and third conditions being satisfied and the fifth condition not being satisfied.

4. The method according to claim 1, wherein the method comprises:
   operating the first and second cooking zones according to the second algorithm based on the second condition not being satisfied,
   wherein a primary cooking zone of the second algorithm is the cooking zone having the greater requested power, and a secondary cooking zone of the second algorithm is the cooking zone having the lower requested power.

5. The method according to claim 1, wherein the method comprises:
   determining whether the third condition is satisfied, and
   operating the first and second cooking zones according to the third algorithm based on the second condition being satisfied and the third condition not being satisfied.

6. The method of claim 1, wherein the first algorithm comprises:
   pulsing power supplied to the active cooking zone from a generator, wherein interruptions of said pulsed power depend on the requested power for the active cooking zone, and
   regulating a frequency of the generator to meet a minimum deliverable power of said active cooking zone.

7. The method according to claim 1, wherein the evaluating step comprises determining whether the fourth condition is satisfied.

8. The method according to claim 1, wherein the method comprises operating the first and second cooking zones according to the second algorithm based on the second condition not being satisfied, wherein according to the second algorithm:
   the cooking zone with the higher requested power is defined as a primary zone, while the other cooking zone is defined as a secondary zone,
   power is continuously supplied to the primary zone in order to meet the requested power, and
   power is supplied to the secondary zone during a pattern duty-cycle activation time (Tpdc) related to an adaptable cycle period (Tadcp):

$$Tpdc[secondary]=(PR[primary]/PR[secondary])*Tadcp,$$

wherein PR is the requested power of the respective cooking zone.

9. The method according to claim 1, wherein the evaluating step comprises determining whether the third condition is satisfied.

10. The method according to claim 9, wherein:
   the method comprises operating the first and second cooking zones according to the third algorithm based on the second condition being satisfied and the third condition not being satisfied,
   the third algorithm comprises supplying power for each of the first and second cooking zones according to a respective duty-cycle activation time (Tdc1, Tdc2) calculated by:

$$Tdc1=(P1/minDP1)*Tcp, \text{ and}$$

$$Tdc2=(P2/minDP2)*Tcp,$$

minDP1 and minDP2 are the minimum deliverable powers of the first and second cooking zones, respectively, and
   Tcp is a pulsed cycle period between two and twelve seconds.

11. The method according to claim 9, wherein the evaluating step comprises determining whether the fifth condition is satisfied.

12. The method according to claim 11, wherein the evaluating step comprises determining whether the sixth condition is satisfied.

13. The method according to claim 11, wherein the method comprises operating the first and second cooking zones according to the fifth algorithm based on the first, third, and fifth conditions being satisfied, wherein according to the fifth algorithm:
- the cooking zone with the lower requested power is defined as a primary zone, while the other cooking zone is defined as a secondary zone,
- power is supplied to the primary zone for a pattern duty-cycle activation time (Tpdc) related to an adaptable cycle period (Tadcp):

$$Tpdc=(PR/minDP)*Tadcp,$$

wherein PR is the requested power of the primary zone and minDP is minimum deliverable power for the primary zone.

14. The method according to claim 13, wherein according to the fifth algorithm, power is supplied to the secondary zone for a remainder of the adaptable cycle period (Tadcp).

15. A method for controlling a first cooking zone and a second cooking zone of an induction cooking hob, comprising:
- receiving at least one of a first requested power (P1) for the first cooking zone or a second requested power (P2) for the second cooking zone;
- performing an evaluating step that comprises determining whether a first condition is satisfied, the first condition being defined as both P1>0 and P2>0, wherein if the first condition is satisfied the evaluating step further comprises determining whether a second condition is satisfied, the second condition being defined as both P1<50% of a first maximum deliverable power (maxDP1) for the first cooking zone and P2<50% of a second maximum deliverable power (maxDP2) for the second cooking zone, and
- selecting an algorithm from a plurality of different algorithms based on a result of the evaluating step, and
- operating one or both of said first and second cooking zones according to the selected algorithm,
- wherein the evaluating step further comprises determining whether a third condition is satisfied, the third condition being defined as:
- P1>P2, or
- (P1+P2)>50% of both of the respective maxDP1 and maxDP2.

16. The method according to claim 15, the third condition being defined as P1>P2.

17. The method according to claim 15, the third condition being defined as (P1+P2)>50% of both of the respective maxDP1 and maxDP2.

18. The method according to claim 17, wherein the evaluating step further comprises determining whether a fourth condition is satisfied, the fourth condition being defined as P1<25% of maxDP1 or P2<25% of maxDP2.

* * * * *